United States Patent
Corp et al.

(10) Patent No.: US 6,529,569 B1
(45) Date of Patent: Mar. 4, 2003

(54) ARCHITECTURE FOR INCREASING DENSITY OF CHANNEL BANK IN DIGITAL CARRIER SYSTEM

(75) Inventors: David O. Corp, Clifton, MD (US); Theodore A. Schweitzer, Fairfax, VA (US); Erik G. Dragos, Arlington, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/373,655

(22) Filed: Aug. 13, 1999

(51) Int. Cl.[7] ............................. H03K 7/02; H03K 9/02
(52) U.S. Cl. ...................... 375/353; 375/241; 375/242
(58) Field of Search ................................. 375/353, 242, 375/241, 240; 379/93.08, 93.09, 399.01, 399.02; 378/265, 278, 271

(56) References Cited

U.S. PATENT DOCUMENTS

| | | | |
|---|---|---|---|
| 4,849,972 A | 7/1989 | Hackett et al. | 370/465 |
| 4,849,977 A | 7/1989 | Baun, Jr. et al. | 714/800 |
| 5,034,978 A | 7/1991 | Nguyen et al. | 379/402 |
| 5,191,456 A | 3/1993 | Sutherland et al. | 359/118 |
| 5,197,068 A | 3/1993 | Holien et al. | 370/527 |
| 5,347,566 A | 9/1994 | Law et al. | 379/27.08 |
| 5,347,576 A | 9/1994 | Taylor | 379/399.01 |
| 5,422,950 A | 6/1995 | Miller et al. | 379/399.02 |
| 5,509,065 A | 4/1996 | Fitzgerald | 379/279 |
| 5,521,977 A | 5/1996 | Bergstrom et al. | 379/413.04 |
| 5,555,274 A | 9/1996 | Sheets | 375/257 |
| 5,557,672 A | 9/1996 | Perry et al. | 379/399.01 |
| 5,566,239 A | 10/1996 | Garcia et al. | 379/399.01 |
| 5,574,723 A | 11/1996 | Killian et al. | 370/384 |
| 5,579,320 A | 11/1996 | Hall, III et al. | 370/506 |
| 5,631,956 A | 5/1997 | Bergstrom et al. | 379/399.01 |
| 5,661,778 A | 8/1997 | Hall et al. | 379/29.01 |
| 5,682,385 A | 10/1997 | Garcia et al. | 370/458 |
| 5,682,404 A | * 10/1997 | Miller | 375/222 |
| 5,712,898 A | 1/1998 | Hall, III et al. | 379/29.01 |
| 5,726,986 A | 3/1998 | Emerson et al. | 370/384 |
| 5,784,558 A | 7/1998 | Emerson et al. | 709/230 |
| 5,805,595 A | 9/1998 | Sharper et al. | 370/442 |
| 5,822,398 A | 10/1998 | Hall et al. | 379/26.01 |
| 5,907,614 A | 5/1999 | Bergstrom et al. | 379/413.04 |

FOREIGN PATENT DOCUMENTS

GB 2357 016 A * 6/2001 ............ H04M/3/00

* cited by examiner

Primary Examiner—Mohammad H. Ghayour
(74) Attorney, Agent, or Firm—Alfred N. Goodman; John E. Holmes; Stacey J. Longanecker

(57) ABSTRACT

A double density channel bank architecture compatible with an existing D4 backplane and D4 channel units transmits or receive PCM data on the PAM bus, while simultaneously transmitting or receiving PCM data on the PCM bus. A double density channel unit (CU) provides data for two transmit and two receive T-1 timeslots to increase the capacity of a D4 channel bank from 48 channels to 96 channels. Channel bank timing of PCM data on the PAM bus provides isolation of PCM data and PAM signals on PAM bus. Double density transmit and receive units each support an additional DS1. The receive unit transmits a signal on both CU channels to indicate T-1 failure and to commence trunk processing.

26 Claims, 6 Drawing Sheets

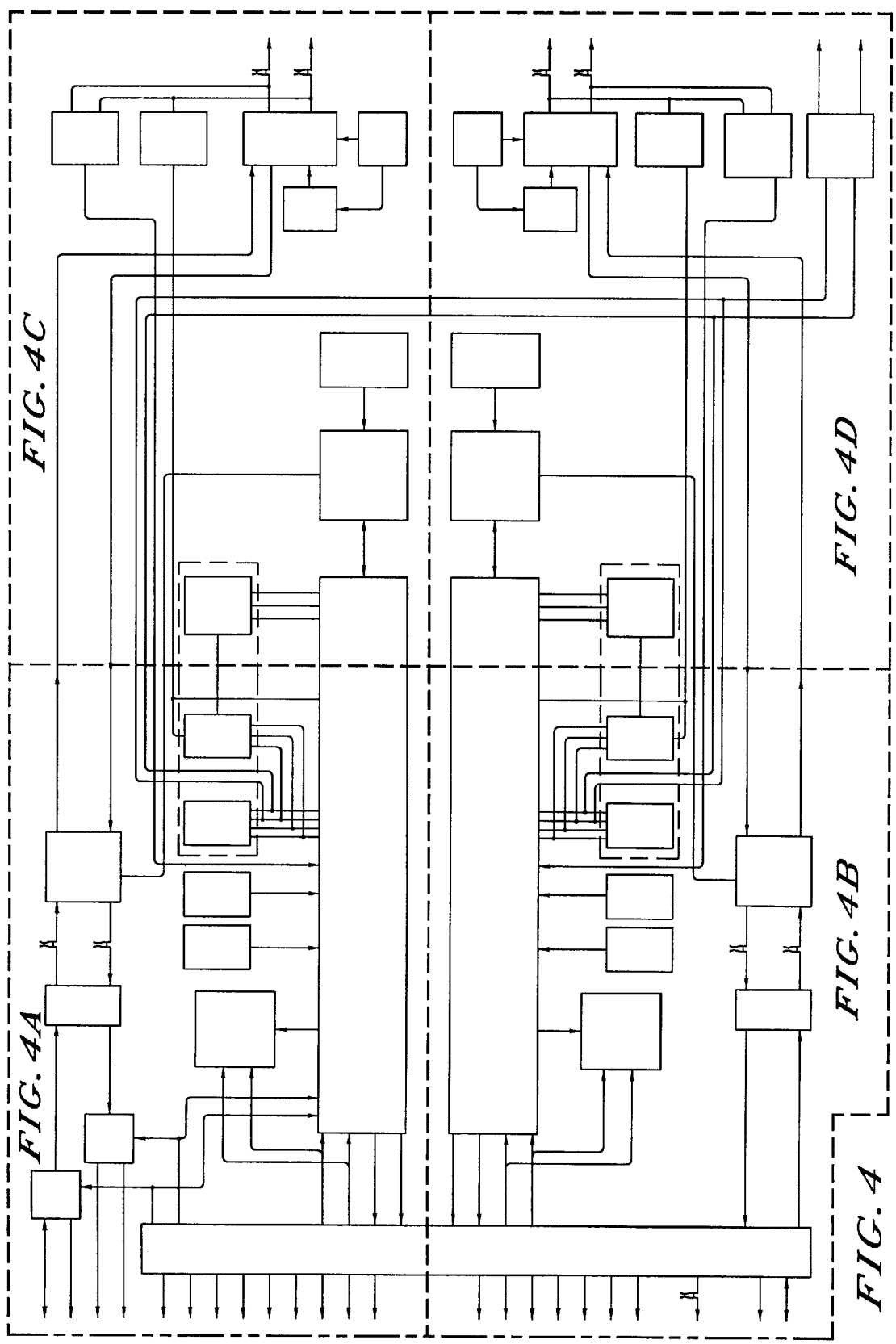

US 6,529,569 B1

ARCHITECTURE FOR INCREASING DENSITY OF CHANNEL BANK IN DIGITAL CARRIER SYSTEM

FIELD OF THE INVENTION

The invention relates to a method and apparatus for increasing the density of a channel bank in a T-1 or other digital carrier system.

BACKGROUND OF THE INVENTION

In a T-1 digital carrier system, a voice signal is sampled. The resulting pulse amplitude modulated (PAM) signal is converted to an 8-bit pulse code modulated (PCM) digital signal which is interleaved with 23 other channels for transmission over a T-1 line at a bit stream rate of 1.544 megabits per second (Mbps). T-1 signals are processed in a channel bank such as the channel bank 20 depicted in FIG. 1. In a conventional digital channel bank, 24 channels are collectively referred to as a digroup. Channel banks typically comprise two digroups A and B to create a 48-channel framework for transmitting and receiving on two duplex T-1 carriers.

As shown in FIG. 1, the channel bank comprises a chassis 24 having physical card slots 26 into which at least 48 channel unit (CU) cards 28 can be inserted, as well as a number of common equipment cards 30 described below. A chassis 24 typically has four rows of card slots with twelve physical card slot locations per row. Two rows of CU cards can constitute a digroup which uses the 24 channels of a T-1 connected to the channel bank. The CU cards 28 and the common equipment cards 30 communicate with each other via a backplane which comprises a pulse amplitude modulated (PAM) bus for analog signals and a pulse code modulated (PCM) bus for digital signals. The backplane 32 is illustrated in FIG. 2 with respect to two cards 28 from two shelves inserted in the chassis 24. The cards have edge connectors 34 with pins 36 that are electrically connected to terminals 38 on the backplane when the cards are inserted into the physical card slots 26 of the channel bank chassis 24.

FIG. 3 depicts CUs and common equipment associated with a conventional D4 channel bank 40 for illustrative purposes. Twenty-four channel units 42A$_1$ through 42A$_{24}$ and twenty-four channel units 42B$_1$ through 42B$_{24}$ constitute the voice/data circuits of digroups A and B. Each channel unit in the digroup A is connected to a transmit unit A (TU A) 44A and to a receiver unit A (RU A) 46A. Similarly, each channel in the digroup B is connected to a transmit unit B (TU B) 44B and to a receiver unit B (RU B) 46B. Each digroup A and B has an alarm control unit (ACU) 48A and 48B, respectively. The common equipment also includes a line interface unit (LIU) 50, a trunk processing unit (TPU) 52, a transmit pre-equalizer 54, an office interface unit 56, a DC-to-DC converter 58 and a power distribution unit (PDU) 60.

The central office floor space of regional Bell Operating Companies (RBOCs) is increasingly in short supply. The ongoing addition of bulky D4 bays to meet increasing consumer demands for telecommunications service, as well as the increasing number of non-RBOC carriers that are co-located within the same office, has exhausted available room or floor space in some central offices. Accordingly, a need exists for a channel bank with increased density, that is, a channel bank which can process more channels (e.g., more than 48 channels) than conventional channel banks in relation to the amount of room a channel bank occupies in a central office or other RBOC facility. A number of channel banks and channel unit cards have been proposed which allow a reduction in the physical size of a channel bank. These channel banks and cards, however, are disadvantageous because they are not easily retrofitted into existing D4 bays, and do not allow for the use of existing channel unit cards and common equipment. Thus, a need exists for a channel bank architecture which increases the number of T-1 channels handled thereby, and which also allows for plug-and-play upgrades to existing D4 bays.

SUMMARY OF THE INVENTION

In accordance with the present invention, a double density channel bank architecture is provided to overcome the problem of diminishing central office space to accommodate additional channel banks.

In accordance with one aspect of the present invention, the double density channel bank architecture is compatible with an existing D4 backplane, as well as existing D4 channel units and a number of common equipment components. Double density channels units and common unit components are provided which can be inserted into an existing channel bank for upgrading to accommodate additional channels per slots.

In accordance with another aspect of the present invention, a channel unit is configured to transmit or receive PCM data on the PAM bus of a channel bank, while simultaneously transmitting or receiving PCM data on the PCM bus. One double density channel unit can therefore provide data for two transmit and two receive T-1 timeslots to increase the capacity of a D4 channel bank from 48 channels or two duplex T-1 carriers to 96 channels or four duplex T-1 carriers.

In accordance with yet another aspect of the present invention, the channel bank architecture provides timing of the PCM data on the PAM bus to avoid bus contention when an adjacent conventional channel unit provides an analog sample on the PAM bus.

A method of increasing the number of digital carrier channels processed in a channel bank is provided comprising the steps of: (1) formatting a first signal for digital transmission on a first carrier channel if the first signal is not digital; (2) formatting a second signal for digital transmission on a second carrier channel if the second signal is not digital; (3) providing a portion of the second signal on a pulse code modulated bus of the channel bank, and (4) providing a portion of the first signal on a pulse amplitude modulated bus of the channel bank, the pulse amplitude modulated bus being operable to transport analog signals from analog cards in the channel bank, the portion of the first signal being provided on the pulse amplitude modulated bus using selected timing to avoid bus contention with the analog signals.

In a channel bank having a chassis comprising card slots for receiving channel units and common equipment components and operable to provide signals to duplex digital carriers, the common equipment comprising receive units, transmit units, a line interface unit and a trunk processing unit, the channel bank having a backplane comprising a pulse code modulated bus and a pulse amplitude modulated bus, the channel units providing a single subscriber circuit for transmitting and receiving signals via a single duplex channel on one of the duplex digital carriers, an improved channel bank architecture provides increased density of subscriber circuits in the channel bank without changing the card slots and the chassis. The improved channel bank architecture comprises an increased density channel unit configured for insertion in one of the card slots, the increased density channel unit being operable to provide a portion of a first second signal on the pulse code modulated bus of the channel bank and a portion of a second on the pulse amplitude modulated bus substantially simultaneously to support two of the subscriber circuits in the corresponding one of card slots.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
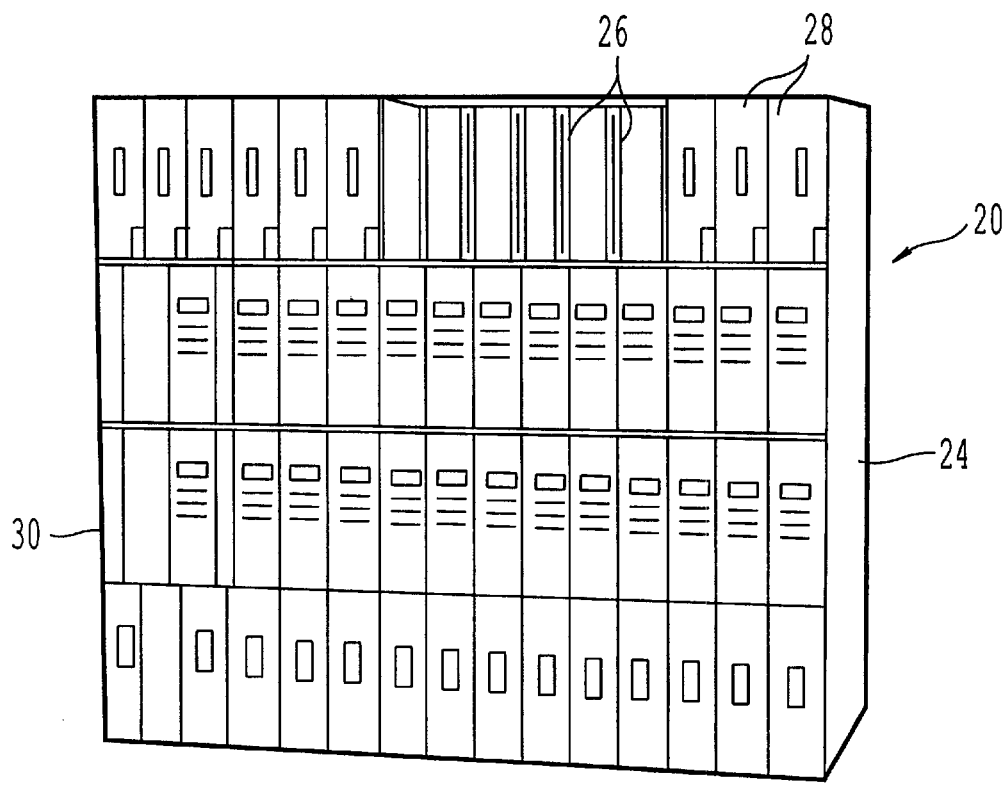
FIG. 1 is a front view of an exemplary channel bank.
Figure 2:
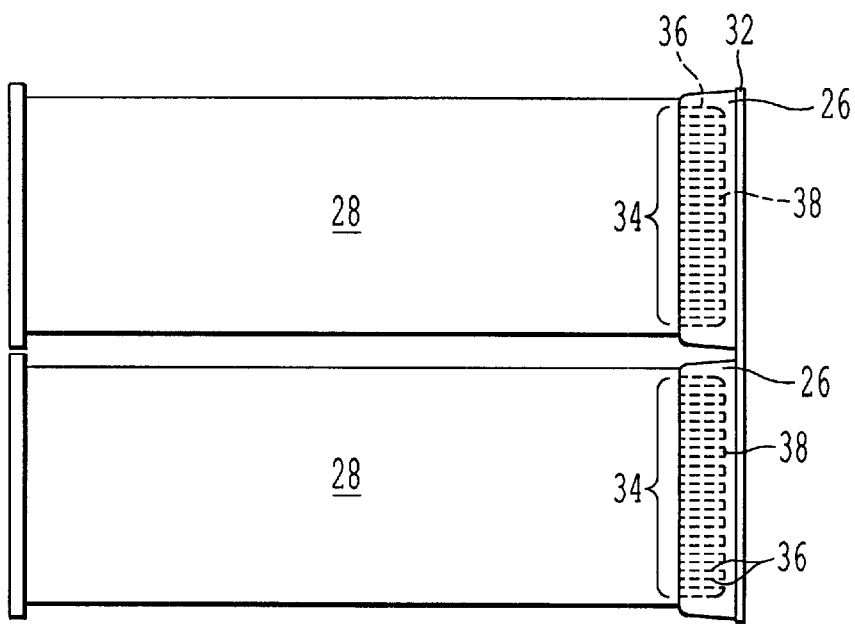
FIG. 2 is a cross-sectional view of two channel unit cards in the channel bank of FIG. 1.
Figure 3:
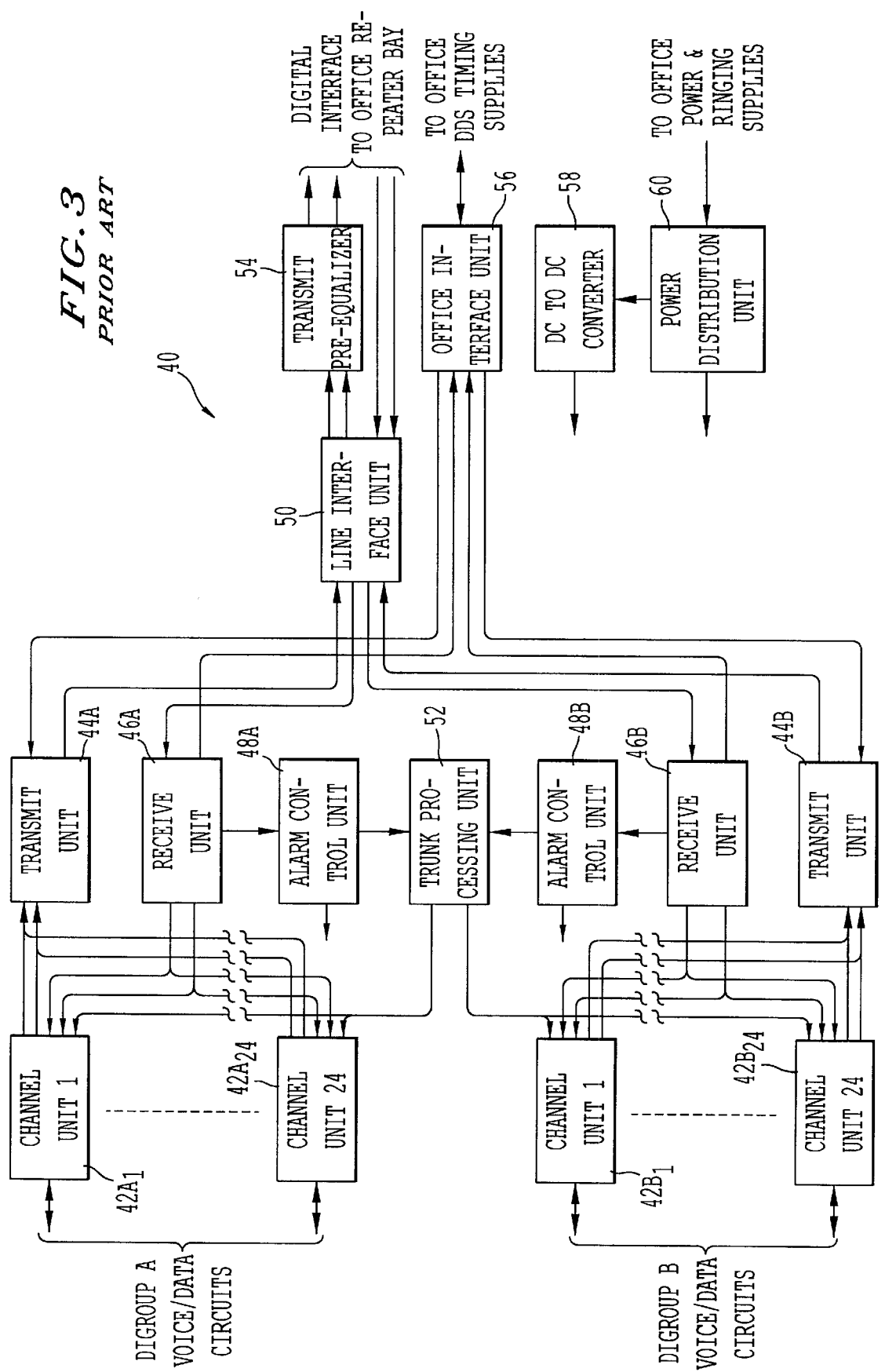
FIG. 3 is a block diagram of a conventional D4 channel bank comprising common unit components and channel units.
Figure 5A:
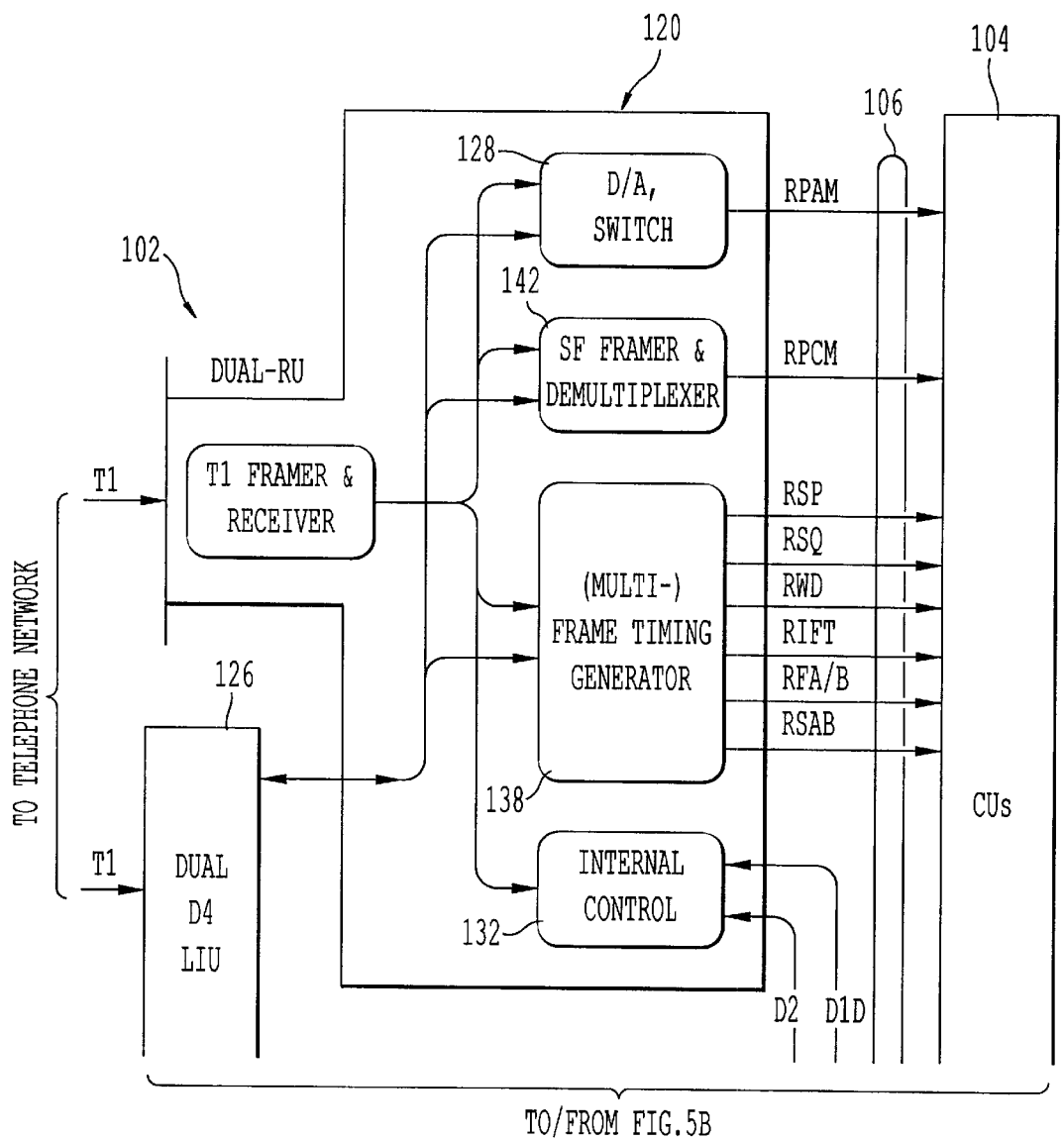
FIG. 5 is a block diagram of double density common unit components constructed in accordance with an embodiment of the present invention to operate with one or more of the double density channel units depicted in FIG. 4, as well as with conventional analog and digital channel units.
Figure 5B:
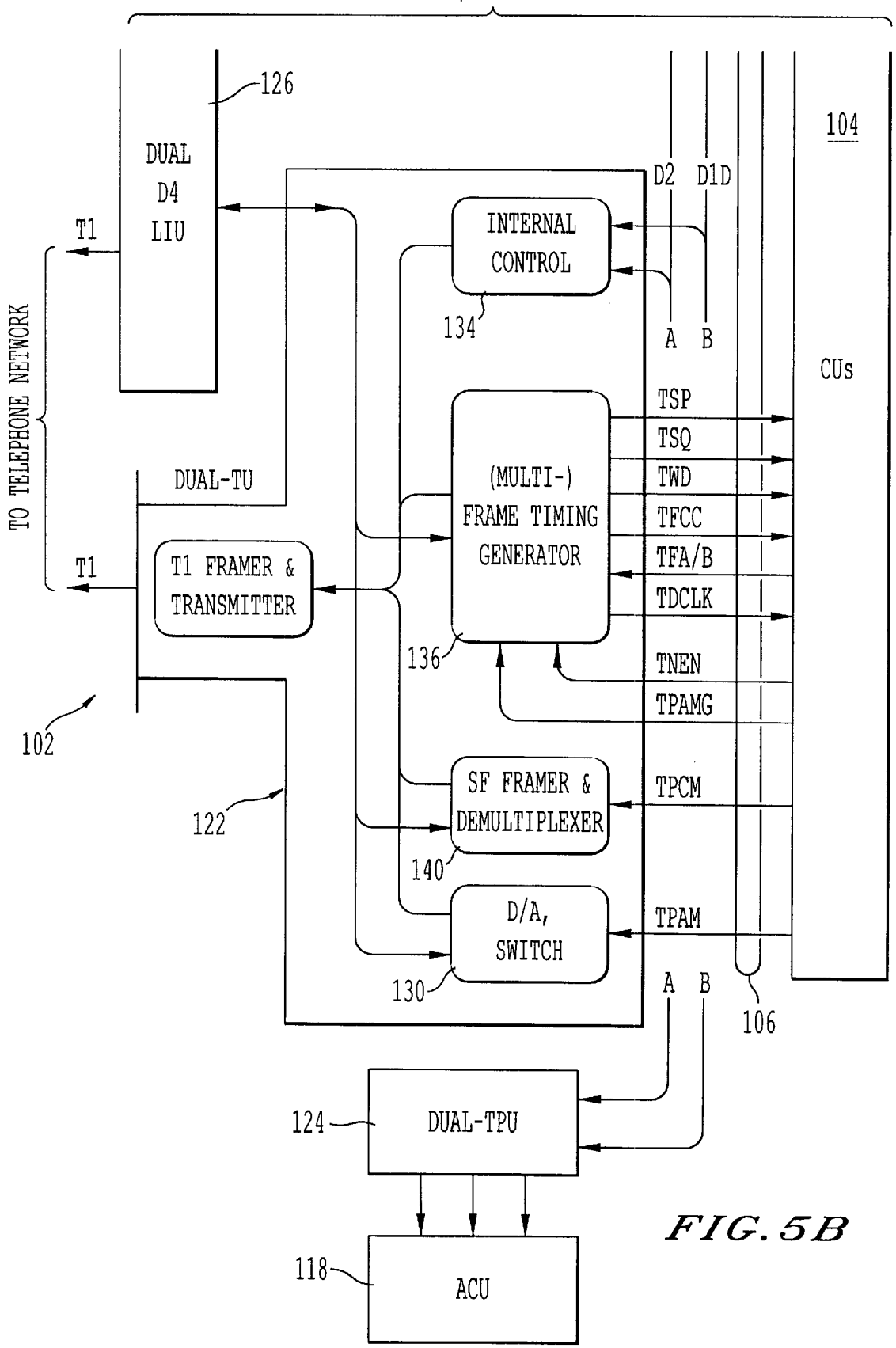

FIGS. 4 and 5 depict a channel unit (CU) 100 and common unit components 102, respectively, which are constructed in accordance with an embodiment of the present invention. With reference to FIG. 5, the common unit components 102 generate and transmit signals to CUs indicated generally at 104 (e.g., voice and data CUs, as well as CUs 100 of the present invention) and receive signals from the CUs 104. The signals are generally indicated at 106 in FIGS. 4 and 5. The signals 106 are preferably compatible with a D4 backplane. Thus, the common unit components 102 are compatible with CUs 100 of the present invention, as well as with conventional analog and digital channel units such as those depicted in FIG. 3.

In accordance with the present invention, the double density CU 100 and the common unit components 102 are operable to provide PCM data to the PAM bus while, at the same time, allowing conventional analog channel units to provide PAM signals on the PAM bus. The double density CU 100 therefore provides PCM data to both the PAM bus and the PCM bus to double the T-1 or other carrier channel capacity that is available per physical card slot 26 in a conventional channel bank 20. Accordingly, the double density CU 100 and the common unit components 102 use existing backplane buses and physical card slots in a channel bank (e.g., a digital D4 channel bank) to support, for example, 96 circuits for channel bank chassis 24, as compared with the 48 non-concentrated circuits per chassis supported by a conventional channel bank 20. The double density CU 100 and the common unit components 102 of the present invention preferably do not increase the operating speed of any backplane circuit to maintain compatibility with an existing channel bank chassis, as well as to minimize any high frequency roll-off associated with multi-layer backplanes in channel banks.

The double density CU 100 of the illustrated embodiment is a Dial Pulse Terminate/Foreign Exchange (DPT/FXO) channel unit which serves two subscriber lines. The DPT/FXO CU 100 provides either a standard DPT interface or a standard FX interface over a D4 carrier system for each of the two subscriber lines. It is to be understood that different types of the double density CU 100 can be used such as a CU 100 configured to be an office channel unit (OCU) incorporating 2-wire digital data system (DDS) technology. Signaling over the D4 carrier system can be programmed for compatibility with different types of far end devices such as a D4 channel bank or an SLC-96 bank The DPT/FXO CU 100 can be used with a DP0 channel unit, for example, to provide a Direct Inward Dial (DID) link, with a digital private branch exchange (PBX), or with a 2FXS-type CU at the far end of the digital carrier to provide a foreign exchange link.

With reference to FIG. 4, the double density CU 100 of the present invention comprises an application specific integrated circuit (ASIC) 108, and two channel unit modules 110 and 112 that are essentially mirror images of each other and are hereinafter referred to odd and even modules 110 and 112, respectively. The ASIC 108 receives and transmits the signals 106 with respect to the common unit components 102 and the backplane of the channel bank. The odd and even modules 110 and 112 are connected to the telephone network via respective pairs 114 and 116 of tip (T) and ring (R) lines.

With reference to FIG. 5, the common unit components 102 comprise two additional digital DS1 circuits connected to the backplane and described below which are not supported in existing common units; otherwise, no changes to the backplane of a channel bank are needed to implement the present invention. A number of standard D4 common units are used such as an ACU, a PDU, an office interface unit (OIU), and TPU equalizers. For illustrative purposes, the ACU 118 is shown in FIG. 5, along with selected common equipment. The receive unit (RU), the transmit unit (TU) and the TPU of conventional common unit equipment are replaced with a double density RU 120, a double density TU 122 and a double density TPU 124, respectively, in accordance with the present invention. In addition, a modified LIU 126 is used in lieu of a conventional LIU. The modified LIU 126 incorporates modifications to one circuit path and supports two channels.

As stated previously, the PCM and PAM buses of a D4 backplane are used in accordance with the present invention to simultaneously transmit two bytes of PCM data between the common unit components 102 and the double density channel cards 100. In contrast, conventional D4 systems use either the PAM bus to transmit an analog sample or the PCM bus to transmit one byte of data proframe. The double density RU 120 and the double density TU 122 use conventional analog-to-digital and digital-to-analog converters, as indicated by the digital/analog (D/A) switches 128 and 130, to support both conventional channel units that do not use two or more time slots or channels per frame, as well as provide PCM support of both channels in a double density CU 100.

To avoid TIRKS issues, a double density channel bank architecture having double density common unit components 102 and double density channel cards 100 in accordance with the present invention divides each standard D4 digroup A and B into two separate digroups, that is, A1 and A2, and B1 and B2. The digroups A1 and B1, for example, use a DS1 interface on the modified LIU which is similar to the DS1 interface on a conventional LIU. The digroups A2 and B2 use additional DS1 interface leads which are connected in accordance with an embodiment of the present invention to previously unused pins on the channel bank RU edge connector and on the channel bank TU edge connector. Accordingly, the double density TU 122 services the digroups A1 and A2 and operates as a Transmit LIU for the digroup A2. The double density RU 120 services the digroups A1 and A2 and operates as a Receive LIU for the digroup A2. The double density TU 122 also services the digroups B1 and B2 and operates as the Transmit LIU for the digroup B2. The double density RU 120 also services digroups B1 and B2 and operates as the Receive LIU for the digroup B2.

The double density RU in FIG. 5 has the functionality of a conventional superframe/extended superframe (SF/ESF) LIU. The additional DS1 interface leads are preferably connected to the pins 51 and 52 of the RU edge connector which are unused in a conventional channel bank. The double density channel bank of the present invention preferably uses conventional sequential time slot counting. Thus, backplane traces normally used by a conventional TPU to force TU and RU sequential time slot counting, or D1D or D2 time slot counting are available in the double density channel bank to establish a communication link between the double density RU 120 and the double density TU 122 through the double density TPU 124, as illustrated via the internal control modules 132 and 134. The outgoing, additional DS1 transmit leads are connected to pins on the channel bank TU edge connector (e.g., pins 51 and 52) that are not used in a conventional channel bank.

In accordance with the present invention, a channel bank such as a D4 channel bank is upgraded using two double density RUs 120, two double density TUs 122, a modified LIU 126 and a double density TPU 124. FIG. 5 illustrates one double density RU 120 and one double density TU 122 for use with a divided digroup A1 and A2. It is to be understood that another double density RU/TU pair is used for the divided digroup B1 and B2 which also operate with the modified LIU 126, the double density TPU 124 and the ACU 118 depicted in FIG. 5, along with other common equipment such as a PDU 60 and so on. Each digroup A1, A2, B1 and B2 provides signals for separate transmit and receive T-1 pairs. Thus, the channel bank architecture of the present invention supports four duplex T-1 carriers, that is, two more duplex T-1 carriers than a conventional D4 channel bank. FIG. 5 illustrates two duplex T-1 carriers provided by the divided digroup A1 and A2, for example.

The operation of the common unit components 102 illustrated in FIG. 5 in connection with a double density CU 100 (FIG. 4) or other CU will now be described. The double density TU 122 receives signals (e.g., DS0 data) from customer premises equipment (CPE) via the CUs 104. The double density RU 120 receives signals from the network (e.g., an OSS) for delivery to a customer via T and R leads connected to a channel unit. The double density CU 100 operates in accordance with transmit sequence control leads (e.g., TSP and TSQ) and a clock signal (e.g., TDCLK) provided by the frame timing generator 136 to decode its channel strobe using TSP and TSQ and to transmit data onto TPCM in a respective one of multiplexed time slots (e.g., 24 time slots) of a multichannel digroup (e.g., digroup A1). The clock signal is 1.544 MHz and the transmission of eight bits per strobe corresponds to one 64 Kbps (DS0) channel for a T-1 line. The double density TU 122 collects 192 bits, that is, eight bits from each of 24 channels, from the TPCM bus, appends a framing bit using a superframe (SF) framer and demultiplexer 140 and outputs the resulting PCM stream onto the PCM bus 132.

For receiving operations, incoming T-1 carrier signals from one of the two T-1 receive carriers for the divided digroup A1 and A2 are received via the modified LIU 126 or the double density RU 120, which provide LIU functions for digroup A2, as stated above. The SF framer and demultiplexer 142 converts the extended superframe formatted signals to superframe formatted signals, as necessary. The double density RU 120 synchronizes its timing with the DS1 framing pattern of the received signal and supplies channel unit control signals (e.g., RSP, RSQ and RWD) to the channel units using the frame timing generator 138 to allow each channel units to decode its channel select strobe and extract its corresponding byte of data from RPCM. The TPAM and RPAM provide additional buses with which analog channel units deliver and receive pulse amplitude modulated samples of analog signals to and from, respectively, the double density TU 122 and the double density RU 120.

The double density RU 120 and the double density TU 122 operate with conventional CUs. As stated previously, the channel bank architecture of the present invention doubles the density of a conventional channel bank by providing two channels (e.g., hereinafter referred to as odd and even time slots) per physical card slot location. In such an arrangement, a conventional CU uses odd time slots, for example. The even time slot for that physical slot is not used. Thus, if only conventional CUs are connected to slots in a shelf, the T1 associated with that digroup (e.g., digroup A1) has traffic only in the odd-numbered time slots (i.e., time slots 1, 3, 5, 7, 9, 11, 13, 15, 17, 19, 21 and 23). If a double density CU 100 is used in the first physical card slot of a channel bank in lieu of a conventional CU, time slots 1, 2, 3, 5, 7, 9, 11, 13, 15, 17, 19, 21 and 23 are used.

In a conventional D4 channel bank, PAM and PCM samples occur at slightly different times. As a result, a potential incompatibility exists when a conventional unit is inserted into an adjacent card slot in the channel bank chassis with respect to a double density CU 100 of the present invention. The double density channel bank architecture of the present invention therefore modifies backplane operation to avoid bus contention by phase shifting the delivery and sampling of even channel PCM data presented on the PAM bus. The placement of PCM data on the PAM bus in the transmit and receive directions is timed in accordance with the present invention to avoid bus contention, as illustrated in the timing diagrams in FIGS. 6A and 6B.

Figure 6A:
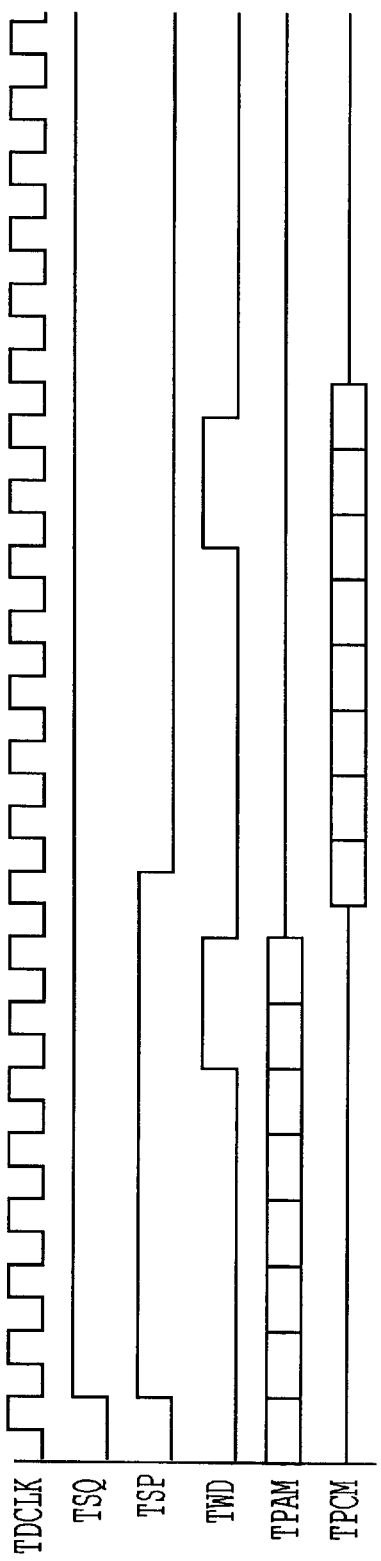
FIGS. 6A and 6B are diagrams illustrating timing waveforms for transmit and receive components of the double density channel unit of FIG. 4.
Figure 6B:
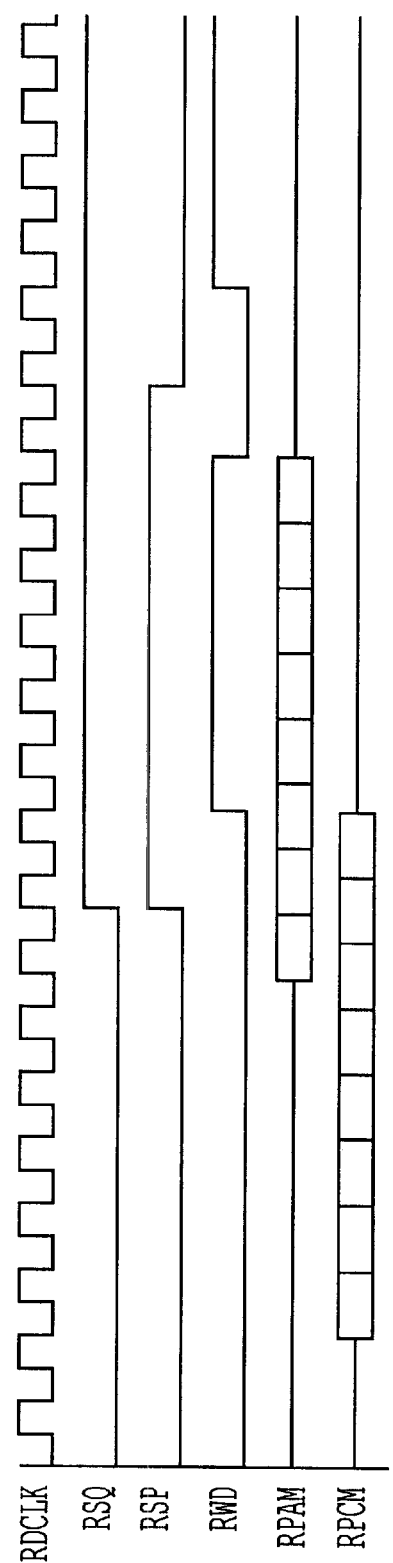
Figure 4A:
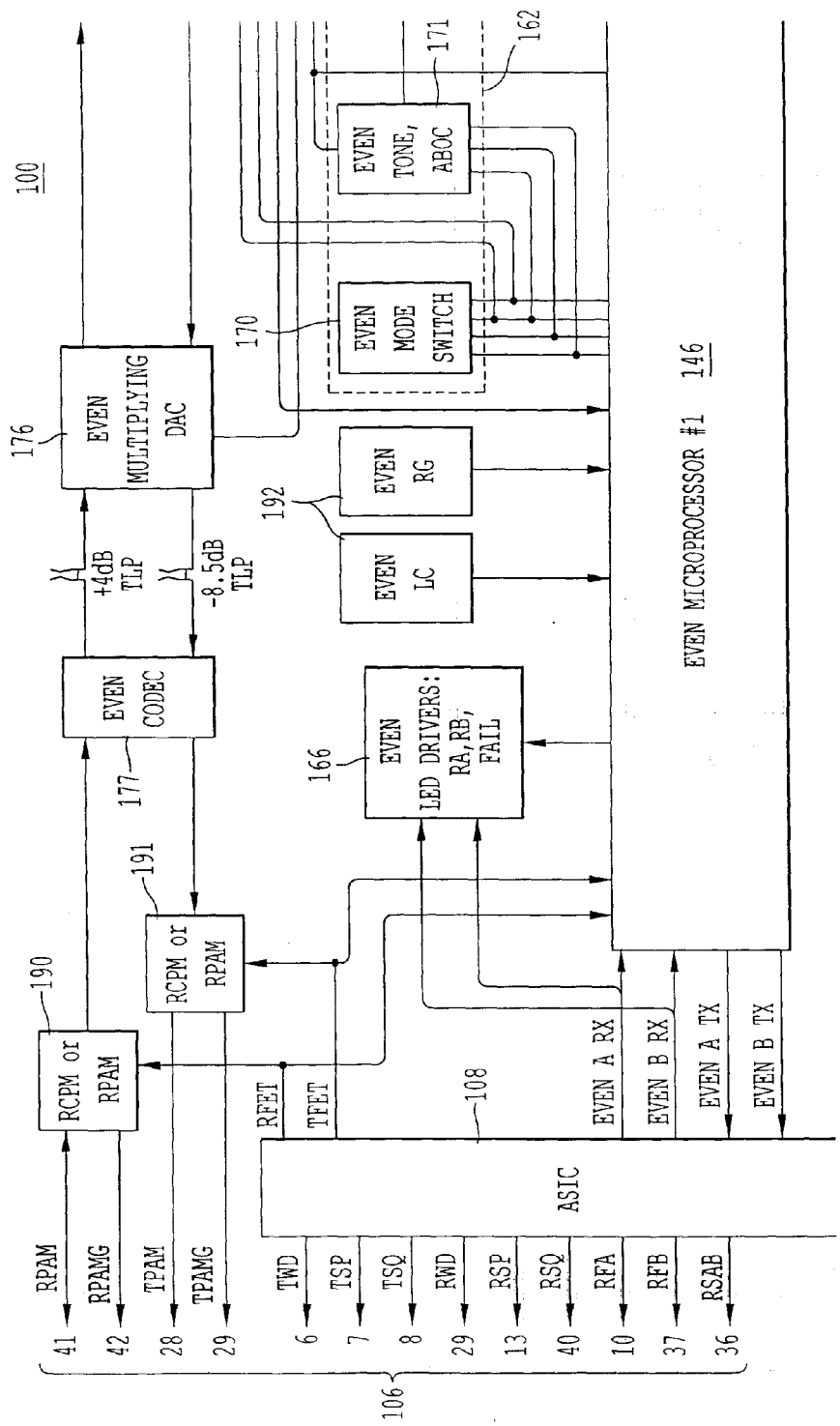
FIG. 4 is a block diagram of a double density channel unit constructed in accordance with an embodiment of the present invention.
Figure 4B:
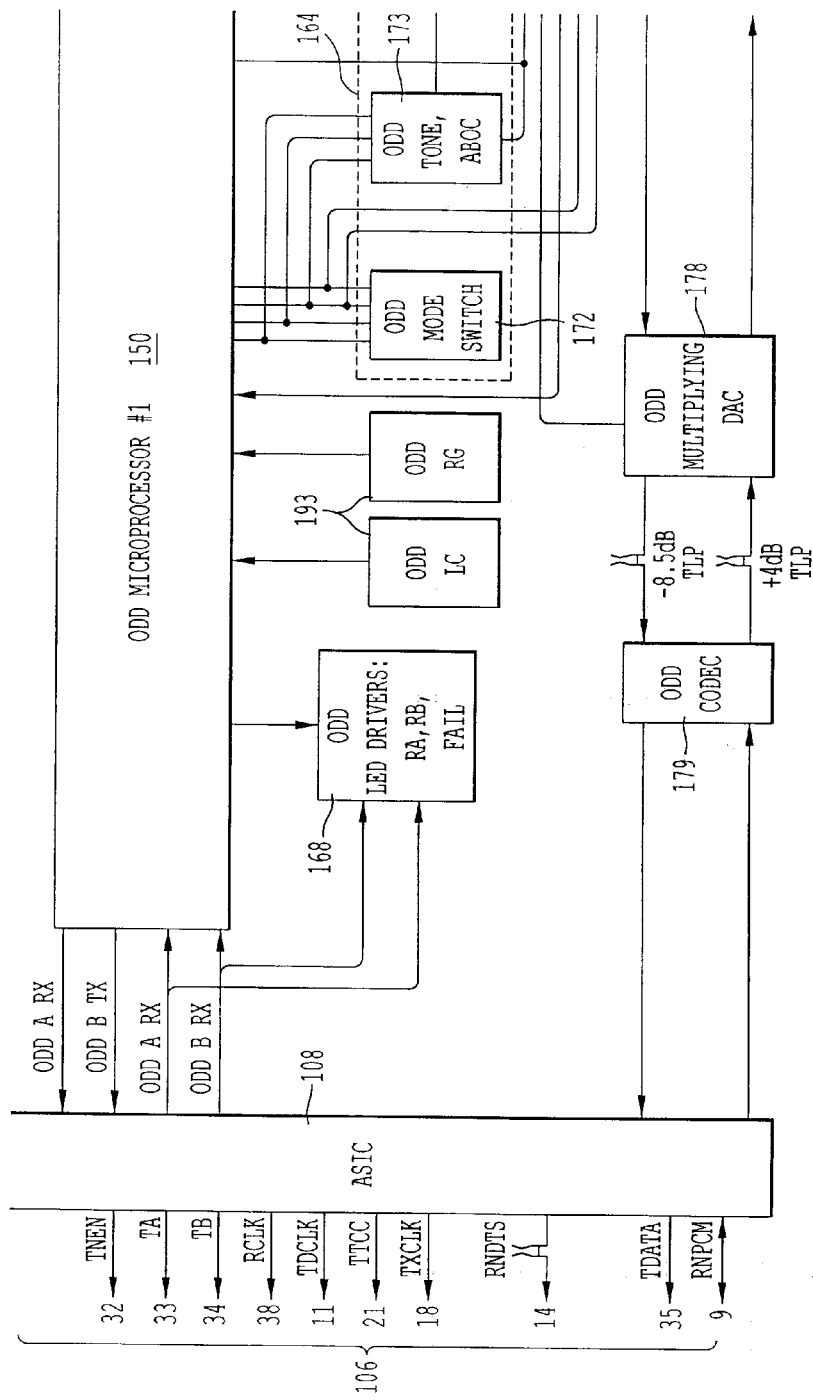
Figure 4C:
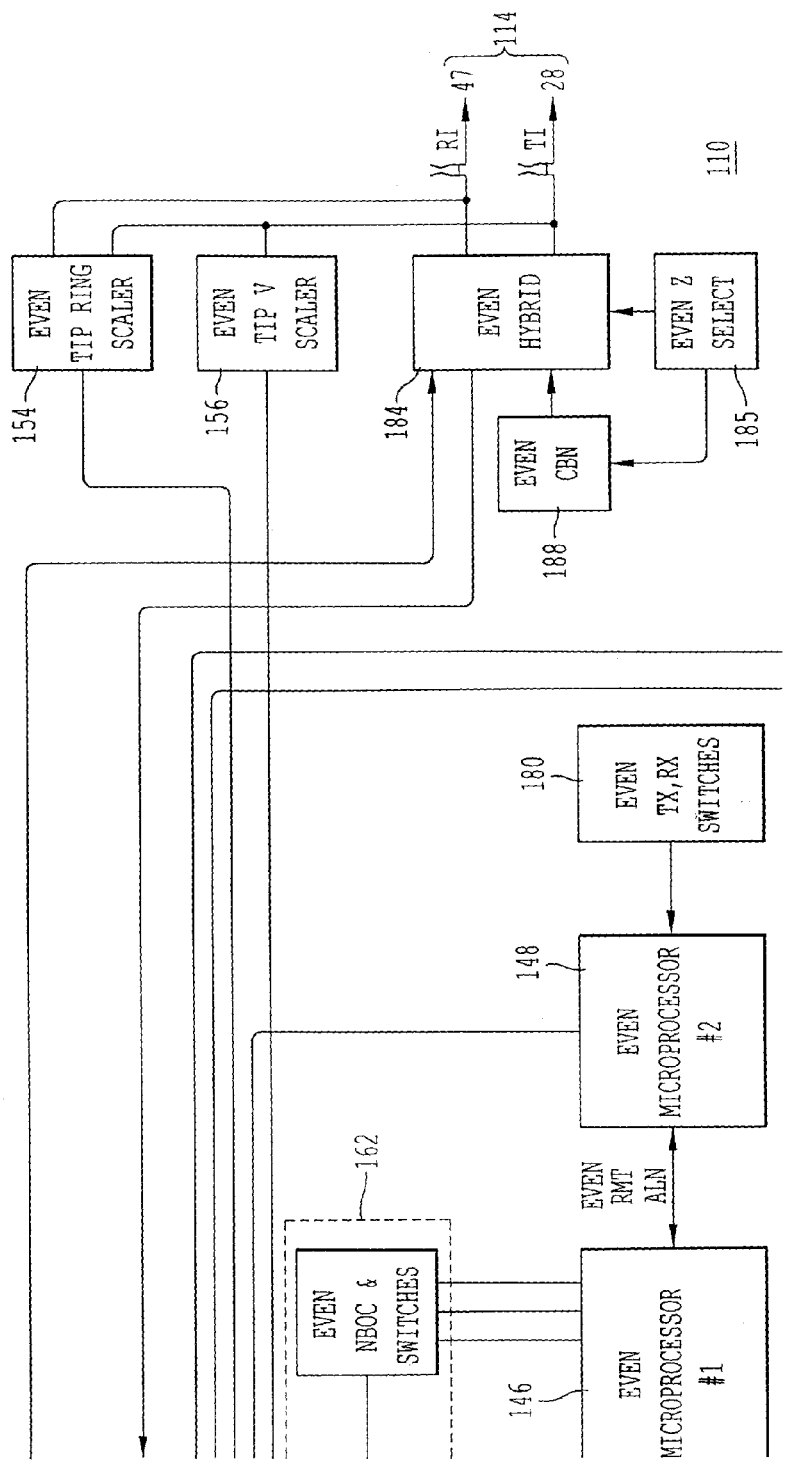
Figure 4D:
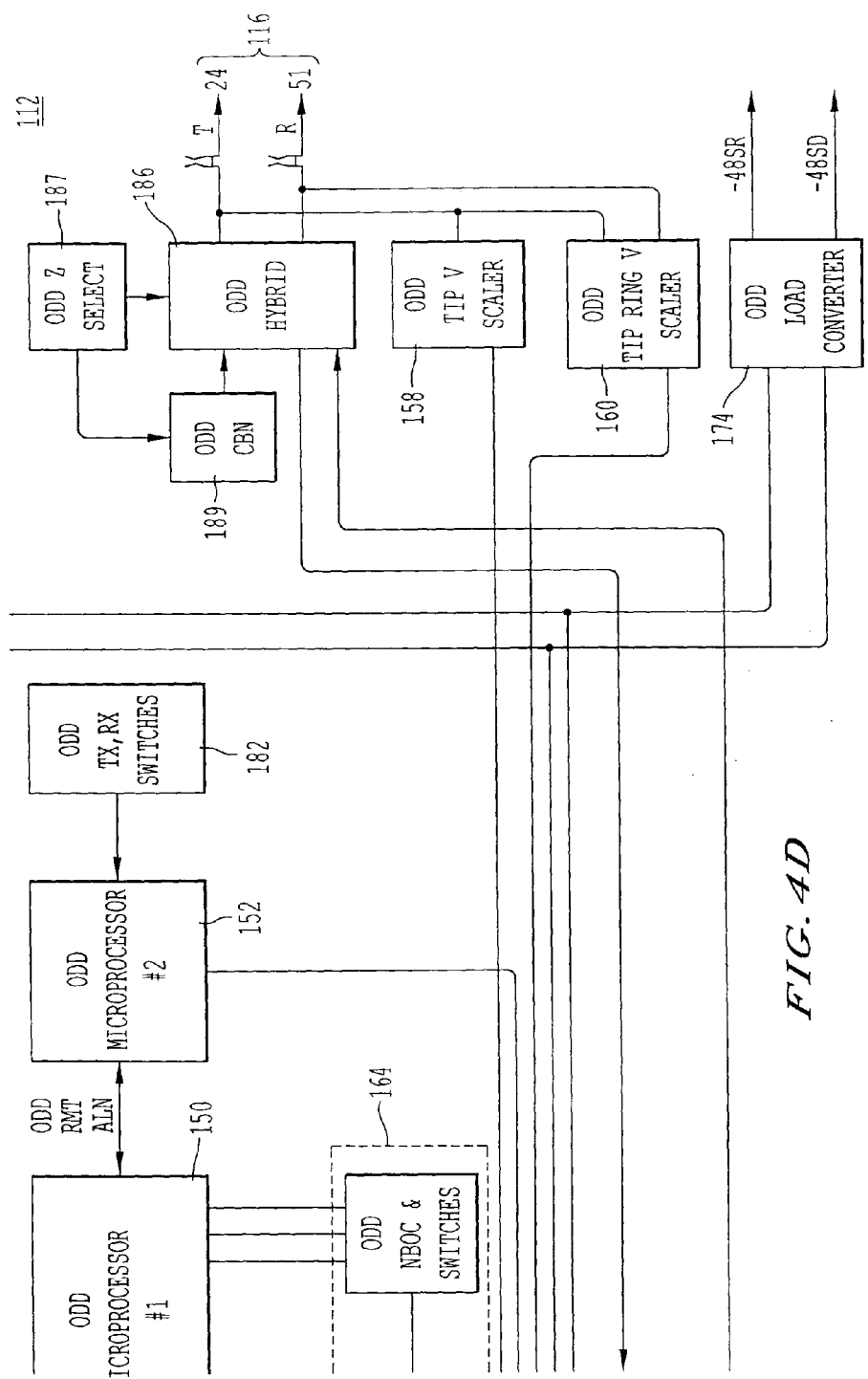

With reference to FIGS. 6A and 6B, clock signals TDCLK and RDCLK are provided in the transmit and receive directions. Signals TSQ and TSP in the transmit direction and signals RSQ, RSP and RWD in the receive direction operate as address decoders to indicate which digroup channel has access to the PAM bus indicated as TPAM or RPAM in FIGS. 6A and 6B. The signals TWD and RWD indicate when signals are provided to the PAM bus. For illustrative purposes, the TWD signal and the RWD signal are active high. Two active high TWD periods are illustrated in FIG. 6A. The first active high period indicates the transmit time for a particular double density CU 100. The next active high period for the TWD signal corresponds to the next card slot location (e.g., a convention CU could place an analog sample on TPAM during this active high period). Accordingly, PCM data preferably appears on the TPAM bus beginning at the falling edge of the previous active high TWD signal and ending at the falling edge of the current TWD to avoid bus contention with any analog sample being provided on TPAM during the next TWD window. Similarly, PCM data preferably appears on the RPAM bus after the falling edge of the previous RWD signal and ends before the leading edge (i.e., falling edge) of the current RWD to avoid bus contention. Switches are provided to isolate the CU circuits from the TPAM and RPAM buses to avoid having any residual PCM signal on the bus for the next sample. The PCM data is provided in the transmit and receive directions to the TPCM and RPCM buses, respectively. Thus, as stated previously, each double density CU 100 can transmit two bytes of data substantially simultaneously on the channel bank PAM and PCM buses to double the capacity of the double density CU 100 and therefore the channel bank.

The channel bank architecture of the present invention is useful for RBOC CO applications and therefore preferably employs external timing. The divided digroups (i.e., A1 and A2, and B1 and B2) are frame synchronized to each other to facilitate robbed bit signaling. For the odd channel in each divided digroup, signaling bits in the receive direction are received using D4 backplane signals RFA and RFB to retrieve the signaling bits from RSAB during the eighth bit position. Transmit signaling for the odd channel is inserted in the eighth bit position and placed on TPCM during the sixth and twelveth frames, as determined using the signal TFCC. The even channel in each divided digroup uses the RFA and RFB signals to extract receive signaling bits from the RPAM bus during the eighth bit position. Transmit signaling for the even channel is inserted in the eighth bit position and placed on TPAM during the sixth and twelveth frames, as determined using the same signal TFCC.

In a conventional D4 channel bank, a CU uses the TNEN lead to inform common units whether the CU is an analog or voice circuit (e.g., TNEN=0), a data circuit (e.g., TNEN= 1), or a double density CU 100 operable in accordance with the present invention. For a double density CU 100, TNEN preferably toggles between "1" and "0" every 125 microseconds. A "1/0" signature is preferably used for double density CU cards 100. The double density CU 100 has on-board codecs 118 and 120 (FIG. 4) to provide a PCM output for both the odd and even channels.

Front panel switches are provided on the double density RU 120 and the double density TU 122 to select SF/ESF or AMI/B8ZS operating for the A2 and B2 digroups. A1 and B1 provisioning is accomplished at the modified LIU 126 in a conventional manner. The double density TU 122 provides switches to select DS1 attenuation.

The double density CU 100 components will now be described with reference to FIG. 4. The "even" and "odd" designations are used herein to refer to the functional capabilities of respective channels provided on a double density CU 100.

In addition to the ASIC 108, two processors are provided on the double density CU 100 (FIG. 4) for each of the odd and even channels. Odd microprocessors 146 and 148 are provided on the double density CU 100 and preferably operate independently of the even microprocessors 150 and 152 provided for the even channel. The main processors 146 and 150 each operate in accordance with one of three state machines, depending on a number of selection switches described below. The processors 146 and 150 each read the scaled A/D signals from the odd TR and T scalers 154 and 156, and the even TR and T scalers 158 and 160, as well as monitor the signaling from the backplane 32 via the ASIC 108 and provide appropriate outputs. The processors 146 and 150 also examine the settings of mode switches indicated generally at 162 and 164, respectively, and set the build out capacitance (BOC) and alignment tone status accordingly. Outgoing signaling information is echoed on the RA and RB front panel LED's via the LED drivers 166 and 168 corresponding to the odd and even circuit modules 110 and 112. During trunk processing, the processors 146 and 150 receive timing information from the −48 SP and −48 SD leads through level conversion circuitry, as well as the RSAB lead, to first idle and then busy the line during trunk processing. The idle/busy codes generated to the far end depend on signaling mode option settings.

A number of inputs to the processors 146 and 150 are multiplexed. For example, mode switches 170 and 172, option switches described below, SP and SD information leads, and the Tip and Ring voltages sensed via a level converter 174 are all multiplexed on preferably six pins of the processors 146 and 150. The information that is read or written by the processor 146 and 150 is determined by how the pins are configured.

The second processors 148 and 152 in FIG. 4 monitor the attenuation switches and program the digital-to-analog converters (DACs) 176 and 178 to provide the proper attenuation in the voice path. The transmit and receive dip switches 180 and 182 are multiplexed onto the data lines of the corresponding DAC 176 and 178 in a manner similar to that used to multiplex information on the main processor 146 and 150. In addition to reading dip switches and writing the attenuation information, during remote alignment with tone selection, the second processors 148 and 152 each send samples at an 8 kHz rate to the corresponding DAC 176 and 178 to provide a 1 kHz tone to the PAM interface to the far end, that is, the hybrid interface 184 and 186.

The hybrid interface 184 and 186 in FIG. 4 provides the interface between the external Tip and Ring leads to the switch, and the attenuation circuitry. It splits two-way transmission on the external port into the Transmit and Receive paths used internally on the card. Two access points on the maintenance access connector (MAC) of the CU card allow customer access to the Tip and Ring leads for testing purposes. The hybrid interfaces 184 and 186 each have respective switches 185 and 187 for selecting the interface impedance, as well as means indicated at 188 and 189 for applying Build Out Capacitance (BOC) to compensate for line capacitance and keep the hybrid interface balanced. The processor 1476 and 150 compares on-hook and off-hook A/D converter measurements. The result is used to reference a table that provides a three bit BOC output.

The DACs 176 and 178 in FIG. 4 provide programmable losses to be inserted in the two signal paths following the hybrid interfaces 184 and 186, respectively. The DACs 176 and 178 include multiplying DAC chips that set the gains. In accordance with the present invention, the DACs 176 and 178 are used in an unconventional manner in that they receive one digital input at initialization and use the input to multiply with the analog signal continual. The corresponding second processor 148 and 152 samples the user attenuation selection from the dip switches 180 and 182 approximately once per second and sends the information to the DAC 176 and 178. Codecs 177 and 179 perform the transmit encoding (i.e., A/D conversion) and the receive decoding (i.e., D/A conversion), as well as the transmit and receive filtering.

Two modules, that is, a TPCM-on-TPAM module 191 and an RPCM-on-RPAM module 190 are provided as backplane interface circuitry which are similar to the PCM-on-PAM interface that is used on existing D4 cards. Analog switches, controlled by TFET and RFET, provide isolation between PCM signals and PAM signals on the PAM bus when the double density CU 100 is used with standard D4 voice channel units.

Switching the mode switches 170 and 172 from a current mode, that is, one of loop start (LS), ground start (GS) or dial pulse terminating (DPT) mode, momentarily to another mode and then back to the desired mode activates remote alignment. During remote alignment, the processors 146 and 152 force signaling in the transmit direction to be LCF to force activation of the far end TG relay. This allows the installer to connect test equipment and measure loss. The RA and RB leads flash on and off once per second to let the installer know that the double density CU 100 is in the remote alignment mode. The double density CU 100 also sends a 1 kHz, 0 dBm0 tone to the far end, bypassing the voice signal, as well as a similar tone to the TIP/RING pair to help identify cable pair location. Remote alignment continues until the user momentarily moves the switch away from the desired operating mode, or 20 minutes elapses.

The tone generators 171 and 173 in FIG. 4 are each enabled by their corresponding processor 146 and 150 when a user selects the remote alignment with tone feature. The processor 146 and 150 sends a signal to the corresponding processor 148 and 152, which performs the actual tone generation. The tone is inserted in the Transmit Multiplying DAC stage by removing the voice signal from the input to the DAC 176 and 178, and using the DAC 176 and 178 as a standard digital code-to-analog signal conversion block. The processor 148 and 152 writes samples to the DAC 176 and 178 at an 8 kHz rate. The tone level can be calibrated along with the transmit level adjustment, but can also be permanently set by a component value during card production.

The scalers 154 and 156 and the scalers 158 and 160 in FIG. 4 sample both Tip voltage and Tip voltage minus Ring voltage and provide scaled down signals to the main processor 146 and 150, respectively. By monitoring the two signals, each processor 146 and 150 has the ability to determine when external events occur on the Tip and Ring interface. For example, the following events can be detected: Tip Ground (TG), Loop Current Feed (LCF), Reverse Loop Current Feed (RLCF), and ringing. The information is used within the processor state machine.

As indicated at 192 and 193 of FIG. 4, a loop closure (LC) optocoupler and ring ground (RG) relay are activated by processor 146 and 150. The processor sends Loop Closure and Ring Ground signals to the device connected on the Tip and Ring interface during the handshaking sequence to establish a call.

Multiprocessing in the processors 146 and 150 of FIG. 4 is preferably achieved by using a round robin scheduler to run several tasks. An interrupt service routine handles the software time critical tasks. Upon power-up, the processor 146 and 150 does a self check of its RAM and ROM.

The firmware of the processors 146 and 150 preferably administers one of three separate state machines in normal operation. The three states machines consist of a Loop Start FX machine, a Ground Start FX machine, and a DPT machine. The Loop Start machine is a subset of the Ground Start machine. Both the Ground Start and Loop Start machines send and receive standard D4 FX codes. The DPT machine follows the standard D4 DPT codes.

The processor 146 and 150 uses one external hardware interrupt, which is connected to the TFET line from the ASIC 108. TFET and RFET (which is input to a counter from the ASIC 108) provide the transmit and receive frame timing, respectively. One pulse occurs for each frame (125 us). The processor 146 and 150 is interrupted on each TFET pulse, at which time the TFET counter (e.g., a counter in software) is updated, and the RFET counter (e.g., a hardware counter) is checked. The transmit and receive signaling bits can transition once every superframe, or 12 standard frames. The interrupt is processed within one frame in order to maintain synchronization. Thus, the interrupt service routine occurs once every 125 us and is completed within 125 US.

The processor 146 and 150 examines option switches upon power-up, and then again once per half-second. The mode switch 170 and 172 is first read upon power-up to determine in which state machine to operate. The processor 146 and 150 reexamines the state once per half-second to determine if the user has changed the setting. If a change is found, the processor resets itself, components are reinitialized, and processing in accordance with the new state machine commences.

The processor 148 and 152 examines the attenuation switches once per halfsecond and programs the desired attenuation into the transmit and receive hardware circuitry. The remote alignment state determined by the position of the mode switch 170 and 172 is also examined each half-second, and, if remote alignment mode has been selected, the processor enters this state. During remote alignment mode the signaling to the far end is forced to the busy code to enable service personnel to connect equipment and make voice measurements. In addition, if the tone option is selected, the processor 146 and 150 signals the corresponding processor 148 and 152 to enable a precision tone generator and bypass the normal transmit and receive voice information. A change in the mode switch position or a timeout after 20 minutes cancels the remote alignment mode.

The RG relay and LC optocoupler are controlled by the processor 146 and 150. The state machine determines their activation. The RG relay, when activated, connects a ground on the ring lead and is used to signal the switch that a call is being initiated. The LC optocoupler causes a loop to be placed from Tip to Ring, which draws current from the switch, signaling the switch that a line is being used.

Signaling is sent and received via the ASIC 108. The processor 146 and 150 samples the receive signaling once every twelve frames and sends transmit signaling once every twelve frames. Signaling is sent/received in parallel format, that is, two bits each designated A and B. In order to produce the toggling bit state required for some LSAS codes, the processor 146 and 150 alternately sends a 1 and then a 0 on one (or both) of the bits as required for transmit signaling. The A and B LED's are set to follow the received signaling.

The processor 146 and 150 receives information from the TG, LCF, RLCF, and ringing detectors, some of which are detected from the A/D inputs, and uses the information to drive the state machine. The TG information is multiplexed with LCF, and indicates when the office end has battery and/or Tip Ground. RLCF is used for DPT to indicate when the office battery is reversed. Ringing indicates when an incoming call is available from the switch.

With regard to alarming, the channel bank architecture of the present invention collects alarms detected by the double density RU 120 and passes them to the existing ACU 118 which, in turn, utilizes the existing D4 capacity to report audible and visual office alarms. In this manner, the existing ACU Alarm Cut Off (ACO) capability can silence alarms. The double density RU edge connector pins 54 and 27 are also connected to a set of dry relay contacts that are closed to provide an indication of the new DS1 alarm. The LIU functionality built into the double density RU 120 is utilized to detect out of frame and yellow alarm states on the new DS1 and illuminate corresponding red "AR" and yellow "AY" LEDs on the double density RU front panel. The new DS1 of the double density RU also responds to ESF payload loopbacks commands by illuminating a green front panel LB LED and sending a trunk processing indication to the double density channel units.

The double density CU 100 of the present invention preferably responds to trunk processing in the same manner as standard D4 channel units. Double density CU 100 and common unit components 102 of the present invention preferably do not activate the signals RNDIS, SP and SD and do not allow the condition corresponding to when RFA and RFB are both high. Thus, a problem can arise when standard D4 channel units are used in a channel bank that has been upgraded using the double density CU 100 and common unit components 102 of the present invention. The signals RNDIS, SP, SD, RFA and REB are bussed to all channels for both shelves. If, for example, the DS1 to digroup B1 fails, RNDIS can disable standard channel units in digroups B1 and B2 even though the DS1 to digroup B2 is operational. To such disablement, the double density RU 120 can selectively terminate RPCM, by sending all one's, and RPAM, by send zero volts, while sending an idle signaling pattern to the all channel units.

Upon detection of carrier loss, the double density RU 120 can freeze and revert back to the previous A signaling bit, assuring that the A bit was valid, as well as set the b bit to all channel units. The double density RU 120 can also send all 1's in the PCM streams and zero volts on PAM. In accordance with the present invention, the double density RU 120 generates a MUX-OUT-OF-SYNCH signal when the T-1 fails. The double density CU 100 is operable to enter trunk processing when the signal is detected on both channels. This eliminates trunk processing in the channel units and shifts that process to the double density RU 120.

The double density channel bank architecture of the present invention does not support two original D4 maintenance capabilities, that is, (1) the ability to inject and send a digital miliwatt simultaneously to all 24 channels of a digroup; and (2) the ability to shift time slots by twelve positions during a loopback This capability was intended to simplify the alignment of 2-wire voice cards (e.g., a tone injected into 2-wire port 1 can be monitored at 2-wire port 13, and so on). These capabilities, however, are seldom used because their use requires an entire digroup to be taken out of service.

The double density channel bank architecture of the present invention supports the standard Loop Terminal (LT) and Loop Line (LL) loopbacks for the new DS1 via the double density TU 122 and the double density RU 120 front panel pin jacks. A pin plug is inserted in both double density TU and double density RU LT jacks to initiate a Line Loopback. These loopbacks are available for the original DS1 via standard ACU 118 front panel controls. To initiate a new DS1 loopback, a first pin plug is inserted in either the double density RU 120 or the double density TU 122. A second pin plug is then inserted in the neighboring double density TU 122 or double density RU 120. Because of this need to insert two pin plugs to initiate a new DS1 loopback, the double density RU 120 and double density TU 122 backplane interface design avoids damage, "latch up" or other problems during this process.

In nonnal operation, the double density TU 122 passes new DS1 TNEN information to the double density RU 120 via the TPU DID control bus, and the TUP D2 control bus is held at "0". During a Red alarm, the double density RU 120 changes the D2 control bus to a "1" to instruct the double density TU 122 to send TCLK over the D2 bus to the double density TU 122 to indicate that a payload loopback is in process. The double density TU 122 detects TCLK, removes TNEN from the DID bus, and then accepts DS1 TPCM (the payload) that the double density RU has placed on the DID bus. The double density RU also prevents false yellow alarms when the new DS1 is in ESF mode, that is, it responds only to the ESF yellow alarm bit). Front panel provisioning of the new DSI prevents the need to disrupt existing service in order to change or set up digroup configurations or perform diagnostic tests.

The double density channel bank architecture of the present invention addresses the RBOC need for higher density, plug-and-play, cost effective doubling of available RBOC facility floor space for DID, FX, voice messaging and digital PBX termination circuits. The double density channel bank architecture of the present invention operates with existing DS0 wiring and supports existing D4 services via existing circuit packs, thereby preserving existing RBOC equipment investment and design changes to accommodate less common services. Automatic BOC and loop length adaptation are integrated into a standard channel unit package (e.g., a D4 channel unit) to provide a fast, simple, plug-and-play upgrade to existing CO D4 bays.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of increasing the number of digital carrier channels processed in a channel bank comprising the steps of:

formatting a first signal for digital transmission on a first carrier channel if said first signal is not digital;

formatting a second signal for digital transmission on a second carrier channel if said second signal is not digital;

providing a portion of said second signal on a pulse code modulated bus of said channel bank; and providing a portion of said first signal on a pulse amplitude modulated bus of said channel bank, said pulse amplitude modulated bus being operable to transport analog signals from analog cards in said channel bank, said portion of said first signal being provided on said pulse amplitude modulated bus using selected timing to avoid bus contention with said analog signals.

2. A method as claimed in claim 1, wherein said channel bank comprises card slots into which channel unit cards are inserted for communicating via a backplane comprising said pulse code modulated bus and said pulse amplitude modulated bus, and said step of formatting said first signal and said step for formatting said second signal are both performed on one of said channel unit cards.

3. A method as claimed in claim 2, wherein said step for providing a portion of said second signal to said pulse code modulated bus and said step for providing a portion of said first signal to said pulse amplitude modulated bus occur substantially simultaneously.

4. A method as claimed in claim 2, wherein said one of said card slots is operable to output at least one byte of said first signal on said pulse amplitude modulated bus and at least one byte of said second signal on said pulse code modulated bus, said channel bank being operable to generate at least two digital carrier signals comprising said digital carrier channels, said channel bank providing said one byte of said first signal and said second signal to respective ones of said digital carrier signals.

5. In a channel bank having a chassis comprising card slots for receiving channel units and common equipment components and operable to provide signals to duplex digital carriers, the common equipment comprising receive units, transmit units, and a line interface unit, the channel bank having a backplane comprising a pulse code modulated bus and a pulse amplitude modulated bus, the channel units providing a single subscriber circuit for transmitting and receiving signals via a single duplex channel on one of said duplex digital carriers, an improved channel bank architecture to provide increased density of subscriber circuits in said channel bank without changing said card slots and said chassis, said improved channel bank architecture comprising:

an increased density channel unit configured for insertion in one of said card slots, said increased density channel unit being operable to provide a portion of a first second signal on said pulse code modulated bus of said channel bank and a portion of a second on said pulse amplitude modulated bus substantially simultaneously to support two of said subscriber circuits in the corresponding one of card slots.

6. An improved channel bank architecture as claimed in claim 5, wherein said pulse amplitude modulated bus is operable to transport analog signals from analog cards in said channel bank, said increased density channel bank being operable to provide said portion of said second signal on said pulse amplitude modulated bus using selected timing to avoid bus contention with said analog signals.

7. An improved channel bank architecture as claimed in claim 5, further comprising at least one of an increased density receive unit and increased density transmit unit provided in lieu of a corresponding one of said receive unit and said transmit unit to communicate with said increased density channel unit, at least one of said increased density receive unit and said increased density transmit unit having a digital carrier connected thereto in addition to said duplex digital carriers supported by said channel bank.

8. An improved channel bank architecture as claimed in claim 7, wherein said duplex digital carriers each transport frames comprising a selected number of duplex channels, wherein said channel bank operates with at least one group A comprising said selected number of channels, said improved channel bank architecture comprising at least one of said increased density transmit unit and at least one of said increased density receive unit each having a digital carrier connected thereto and being operable to support the division of said group A into divided groups A1 and A2, said divided groups A1 and A2 together providing at least twice said selected number of channels per said frame, said increased density channel unit being operable to perform at least one of transmitting and receiving operations using at least two of said selected number of channels per frame.

9. An improved channel bank architecture as claimed in claim 8, wherein said channel bank operates with a group B comprising another said selected number of channels, said improved channel bank architecture comprising a second said increased density transmit unit and a second said increased density receive unit each having a digital carrier connected thereto and being operable to support the division of said group B into divided groups B1 and B2, said divided groups B1 and B2 together providing at least twice said another selected number of channels per said frame, said divided groups A1, A2, B1 and B2 being substantially synchronized per said frame for transport via corresponding ones of said duplex digital carriers and said digital carriers connected to said increased density receive unit, said increased density transmit unit, said second increased density receive unit and said second increased density transmit unit.

10. An improved channel bank architecture as claimed in claim 8, wherein said increased density channel units use consecutive said channels of one of said divided groups A1 and A2 and said channel units use alternate ones of said channels of one of said divided groups A1 and A2.

11. An improved channel bank architecture as claimed in claim 5, wherein said backplane comprises a control signal for indicating which of a plurality of channel units is inserted in at least one of said card slots thereof, said plurality of channel units comprising a digital channel unit operable to use only said pulse code modulated bus, an analog channel unit, and said increased density channel unit.

12. An channel unit in a channel bank for transporting digital carriers, the channel bank having a plurality of shelves for receiving respective channel units, the channel bank having a backplane comprising a pulse code modulated bus and a pulse amplitude modulated bus and being operable to transport backplane signals between the channel units and common equipment in the channel bank, the channel unit comprising:

a channel unit interface connected to said backplane for receiving at least one of said backplane signals from and transmitting at least one of said backplane signals to said common equipment;

a first circuit module configured for connection to a first telecommunications link and being connected to said channel unit interface; and a second circuit module configured for connection to a second telecommunications link and being connected to said channel unit interface;

wherein said first circuit module comprises a first codec connected to said channel unit interface and a first digital/analog converter connected between said first telecommunications link and said first codec, said first digital/analog converter and said first codec being operable to transport a first call signal between said backplane and said first telecommunications link;

said second circuit module comprises a second codec connected to said channel unit interface and a second digital/analog converter connected between said second telecommunications link and said second codec, said second digital/analog converter and said second codec being operable to transport a second call signal between said backplane and said second telecommunications link; and said first circuit module providing a portion of said first call signal on said pulse code modulated bus substantially simultaneously while said second circuit module provides a portion of said second call signal on said pulse amplitude modulated bus.

13. A channel unit as claimed in claim 12, wherein said channel unit is in a first card slot, said second circuit module being operable to process backplane signals from said common equipment to determine selected timing operations, said selected timing operations controlling the transport of said at least a portion of said second call signal on said pulse amplitude bus to avoid bus contention with analog signals provided thereon by one of said respective channel units a different one of said card slots.

14. A channel unit as claimed in claim 13, wherein said second channel unit comprises switching devices controlled in accordance with said selected timing operations to provide said at least a portion of said second call signal from said second codec to said pulse amplitude modulated bus via said channel unit interface.

15. A channel unit as claimed in claim 12, wherein said first communication link and said second communication link each comprise tip and ring wire pairs.

16. A channel unit as claimed in claim 12, wherein said common equipment comprises a multiplexer for providing said first call signal and said second call signal on one of said pulse code modulated bus and said pulse amplitude modulated bus and is operable to generate an indicator signal indicating when said multiplexer is out of synchronization, and said common equipment further comprises a trunk processing unit, said channel unit commencing trunk processing via said trunk processing unit when said indicator signal is received by both said first circuit module and said second circuit module.

17. A channel bank for transporting digital carriers comprising:
   a plurality of card slots for receiving one of a channel unit and common equipment, said common equipment being operable with a plurality of said channel units; and
   a backplane comprising a pulse code modulated bus and a pulse amplitude modulated bus and being operable to transport backplane signals between said channel units and said common equipment, said pulse amplitude modulated bus and said pulse code modulated bus each comprising channels, said common equipment comprising at least one receive unit, at least one transmit unit and at least one line interface unit operable to transport call signals for subscriber circuits supported by said channel units on respective said channels on at least one of said pulse amplitude modulated bus and said pulse code modulated bus, said common equipment being configured to support a group X consisting of a selected number of said channels per a selected number of said card slots, said receive unit being connected to at least a first digital carrier and said backplane, said transmit unit being connected to at least a second digital carrier and said backplane, said line interface unit being connected to at least a duplex digital carrier and said backplane, said receive unit and said transmit unit being operable to process said call signals from at least one of said channel units inserted in one of said card slots units of group X, said one of said channel units being configured to support at least two different said subscriber circuits, said receive unit and said transmit unit transporting portions of said call signals from said at least one of said channel units on said pulse amplitude modulated bus and said pulse code modulated bus substantially simultaneously to allow division of said group X into divided group X1 and divided group X2 for support of at least twice said selected number of said channels when each of said card slots in said group X has one of said channel units, said divided group X1 being transported via said duplex digital carrier, said divided group X2 being transported via said first digital carrier and said second digital carrier.

18. A channel bank as claimed in claim 17, wherein said portions of said call signals from said at least one of said channel units and transported on said pulse amplitude modulated bus are provided thereon to avoid bus contention with analog signals provided on said pulse amplitude modulated bus by another one of said channel units, said another one of said channel units being inserted in an adjacent one of said card slots with respect to said at least one of said channel units.

19. A channel unit as claimed in claim 17, wherein said one of said channel units comprises a first circuit module and a second circuit module to process respective ones of said two subscriber circuits, and said receive unit comprises a multiplexer for providing said call signals on one of said pulse code modulated bus and said pulse amplitude modulated bus, and said channel bank further comprises a trunk processing unit connected to said receive unit and said transmit unit, said receive unit being operable to generate an indicator signal indicating when said multiplexer is out of synchronization, said at least one of said channel units commencing trunk processing via said trunk processing using said indicator signal is received by both said first circuit module and said second circuit module.

20. A method of increasing the density of a channel bank, the channel bank being connected to digital carriers operable to transport frames comprising a selected number of channels, the method comprising the steps of:
   receiving first and second call signals at a channel unit for each of two subscriber circuits, respectively; and
   providing portions of said first and second call signals to respective ones of a pulse code modulated bus and a pulse amplitude modulated bus in said channel bank during a frame.

21. A method as claimed in claim 20, wherein digitized portions of said second call signal are provided on said pulse amplitude modulated bus using timing operations to avoid bus contention with analog samples of call signals provided on said pulse amplitude modulated by an adjacent channel unit in said channel bank.

22. A method as claimed in claim 20, wherein said channel bank comprises a group X corresponding to a selected number of said channels and further comprising the step of performing said receiving step and said providing step for each of a plurality of channels in said group X to allow division of said group X into divided group X1 and divided group X2.

23. A method as claimed in claim 22, wherein said selected number of channels in said group X corresponds to the number of said channels in said frame, and further comprising the step of synchronizing said divided group X1 and said divided group X2 with each other during each said frame.

24. A method as claimed in claim 22, wherein said channel bank comprises a group Y corresponding to a selected number of said channels and further comprising the step of performing said receiving step and said providing step for each of a plurality of channels in said group Y to allow division of said group Y into divided group Y1 and divided group Y2.

25. A method as claimed in claim 24, further comprising the step of synchronizing said divided group X1, said divided group X2, said divided group Y1 and said divided group Y2 during each said frame.

26. A method as claimed in claim 20, wherein said channel bank comprises a receive unit and a trunk processing unit, the method further comprising the steps of:

processing said first and second call signals using respective ones of first and second circuit modules in said channel unit;

receiving at least a third call signal at said receive unit for transmission to said channel unit, said receive unit having a multiplexer and being operable to provide said third call signal on one of said pulse code modulated bus and said pulse amplitude modulated bus;

detecting when said multiplexer is out of synchronization;

transmitting an indicator signal to said channel unit; and commencing trunk processing via said trunk processing unit when said indicator signal is received at both of said first and second circuit modules.

* * * * *

UNITED STATES PATENT AND TRADEMARK OFFICE
CERTIFICATE OF CORRECTION

PATENT NO. : 6,529,569 B1
DATED : March 4, 2003
INVENTOR(S) : David O. Corp, Theodore A. Schweitzer and Erik G. Dragos It is certified that error appears in the above-identified patent and that said Letters Patent is hereby corrected as shown below:

Drawing sheets, consiting of Fig. 4, should be deleted to be replaced with the drawing sheets, consisting of Fig. 4A, 4B, 4C and 4D, as shown on the attached pages.

Signed and Sealed this

Fourteenth Day of September, 2004

JON W. DUDAS
*Director of the United States Patent and Trademark Office*